(12) United States Patent
Tanaka et al.

(10) Patent No.: US 10,574,011 B2
(45) Date of Patent: Feb. 25, 2020

(54) TAPE ASSEMBLY, ROTARY CONNECTOR, AND METHOD FOR PRODUCING TAPE ASSEMBLY

(71) Applicants: FURUKAWA ELECTRIC CO., LTD., Tokyo (JP); FURUKAWA AUTOMOTIVE SYSTEMS INC., Shiga (JP)

(72) Inventors: Satoshi Tanaka, Shiga (JP); Hiroaki Inaba, Shiga (JP); Katsumi Takubo, Shiga (JP)

(73) Assignees: FURUKAWA ELECTRIC CO., LTD., Tokyo (JP); FURUKAWA AUTOMOTIVE SYSTEMS INC., Shiga (JP)

( * ) Notice: Subject to any disclaimer, the term of this patent is extended or adjusted under 35 U.S.C. 154(b) by 0 days.

(21) Appl. No.: 16/062,617

(22) PCT Filed: Dec. 15, 2016

(86) PCT No.: PCT/JP2016/005140
§ 371 (c)(1),
(2) Date: Jun. 14, 2018

(87) PCT Pub. No.: WO2017/104137
PCT Pub. Date: Jun. 22, 2017

(65) Prior Publication Data
US 2019/0006805 A1  Jan. 3, 2019

(30) Foreign Application Priority Data

Dec. 17, 2015  (JP) .................................. 2015-246470

(51) Int. Cl.
*H01R 35/02* (2006.01)
*B60R 16/027* (2006.01)
*B62D 1/04* (2006.01)

(52) U.S. Cl.
CPC ......... *H01R 35/025* (2013.01); *B60R 16/027* (2013.01); *B62D 1/046* (2013.01); *H01R 2201/26* (2013.01)

(58) Field of Classification Search
CPC ........ H01R 35/025; H01R 35/00; H01R 4/16; H01R 12/59; H01R 12/77; B60R 16/0207
(Continued)

(56) References Cited

U.S. PATENT DOCUMENTS 5,310,356 A * 5/1994 Obata ................... B60R 16/027
439/15
5,413,492 A * 5/1995 Obata ................... B60R 16/027
439/15
(Continued)

FOREIGN PATENT DOCUMENTS

JP   H09190863 A   7/1997
JP   2002165350 A  6/2002
(Continued)

OTHER PUBLICATIONS

International Search Report for PCT Application No. PCT/JP2016/005140, dated Mar. 14, 2017, 4 pages.

*Primary Examiner* — Hien D Vu
(74) *Attorney, Agent, or Firm* — Amin, Turocy & Watson, LLP

(57) ABSTRACT

Provided is a dummy tape assembly (60) that is attached to a rotary connector. The dummy tape assembly (60) includes a tape body (70) including a plurality of dummy tape portions (61) and a folding back portion (62) integrally formed therein. The plurality of dummy tape portions (61) differ in length in a length direction. The folding back portion (62) connects the dummy tape portions (61) to each other at end portions in the length direction of the dummy tape portions (61) in a folded state. The plurality of dummy tape portions (61) each include attachment holes (63) near
(Continued)

both ends in length direction of each of the plurality of dummy tape portion (61), the openings being configured to allow the tape body (70) to be attached to the rotary connector (1).

10 Claims, 14 Drawing Sheets

(58) Field of Classification Search
USPC .......................................... 439/15, 164, 496
See application file for complete search history.

(56) References Cited

U.S. PATENT DOCUMENTS

| 6,039,600 | A  | * | 3/2000 | Etters | H01R 12/592 |
|---|---|---|---|---|---|
|  |  |  |  |  | 439/496 |
| 7,232,312 | B2 | * | 6/2007 | Wade | B60R 16/027 |
|  |  |  |  |  | 439/4 |
| 7,320,617 | B1 | * | 1/2008 | Bellato | H01R 12/62 |
|  |  |  |  |  | 439/496 |
| 7,758,364 | B1 | * | 7/2010 | Ruden | H01R 35/025 |
|  |  |  |  |  | 439/164 |

FOREIGN PATENT DOCUMENTS

| JP | 2009076281 A | 4/2009 |
|---|---|---|
| JP | 2014033502 A | 2/2014 |

\* cited by examiner

TAPE ASSEMBLY, ROTARY CONNECTOR, AND METHOD FOR PRODUCING TAPE ASSEMBLY

The present application is a U.S. National Stage filing under 35 U.S.C. § 371 of international patent cooperation treaty (PCT) application No. PCT/JP2016/005140, filed Dec. 15, 2016, and entitled "TAPE ASSEMBLY, ROTARY CONNECTOR, AND METHOD FOR PRODUCING TAPE ASSEMBLY", which claims the benefit of priority to Japanese Patent Application No. 2015-246470, filed on Dec. 17, 2015, which applications are hereby incorporated into the present application by reference herein in their respective entireties.

TECHNICAL FIELD

The present invention relates to a tape assembly that is housed in a rotary connector and configured to achieve an improvement in quality and simplification of the manufacturing process.

BACKGROUND ART

There has been known a dummy tape housed in a rotary connector. Patent Document 1 discloses this type of dummy tape. In Patent Document 1, a plurality of dummy tapes are housed along with a plurality of flat cables in an annular space formed by an inner cylindrical body and an outer cylindrical body disposed around the same axis and capable of relative rotation, and are wound a predetermined number of times along an outer surface of the inner cylindrical body, made to turn 180 degrees, and then wound a predetermined number of times in a direction opposite to that of the inner side along an inner surface of the outer cylindrical body. Furthermore, in Patent Document 1, both ends of each of the flat cables are electrically connected and fixed to terminals respectively provided to the inner cylindrical body and the outer cylindrical body.

CITATION LIST

Patent Literature

Patent Document 1: JP 2002-165350 A

SUMMARY OF INVENTION

Technical Problem

However, although not specifically referenced in the above-described Patent Document 1, both ends of the plurality of dummy tapes are respectively fixed to the inner cylindrical body and the outer cylindrical body of the rotary connector at the same locations. Furthermore, according to the configuration of Patent Document 1, the positions of the turn locations of the dummy tapes attached to the rotary connector differ as appropriate in a circumferential direction, causing the lengths of the dummy tapes to differ.

As a result, when both ends of the plurality of dummy tapes are aligned and overlapped, displacement readily occurs at both end positions between the overlapped dummy tapes, potentially causing a decrease in the quality of the dummy tapes and leaving room for improvement.

In light of such circumstances as described above, it is an object of the present invention to provide a tape assembly configured to be attached to a rotary connector, includes a plurality of tape portions that differ in length, and is not susceptible to displacement of both end portions in a length direction of the tape portions, thereby improving quality and achieving simplification of the manufacturing process.

Solution to Problem and Effects

The problem to be solved by the present invention is as described above. Means for solving this problem and effects thereof will be described next.

According to a first aspect of the present invention, a tape assembly having the following configuration is provided. That is, this tape assembly is configured to be attached to a rotary connector. The tape assembly includes a tape body including a plurality of tape portions and a connecting portion integrally formed in the tape body. The plurality of tape portions differ in length in a length direction. The connecting portion connects the plurality of tape portions to each other at end portions in a length direction of the plurality of tape portions in a folded state. The plurality of tape portions each include openings near both ends in the length direction of each of the plurality of tape portions, the openings being configured to allow the tape body to be attached to the rotary connector.

That is, in the related art, both ends of the plurality of tapes differing in length are overlapped and attached to the rotary connector manually, readily causing displacement between the tapes when overlapped as well as complexities in the work process. According to the present invention, the tape assembly is configured by a single continuous tape body, and both end positions of the tape portions connected in a folded state by the connecting portion are aligned and overlapped, making it possible to improve quality by decreasing displacement between the tape portions, and simplify the work process.

Preferably, the above-described tape assembly has the following configuration. That is, when, among end portions in the length direction of the plurality of tape portions, end portions in the length direction where the connecting portion is disposed are called length direction folding back end portions, the connecting portion is disposed connecting the length direction folding back end portions of the plurality of tape portions to each other at center portions in a width direction of the length direction folding back end portions. The connecting portion is formed having a width that is less than a width of an end portion in the length direction of each of the plurality of tape portions.

As a result, a bending strength of the connecting portion is low compared to that of the end portions in the length direction of the tape portions, making it possible to readily fold the tape body at the connecting portion. Furthermore, a shape of the connecting portion can be simplified.

The above-described tape assembly can also have the following configuration. That is, when, among end portions in the length direction of the plurality of tape portions, end portions in the length direction where the connecting portion is disposed are called length direction folding back end portions, a pair of the connecting portions are disposed connecting the length direction folding back end portions of the plurality of tape portions to each other at both end portions in a width direction of the length direction folding back end portions. The connecting portions are each formed having a width that is less than ½ of a width of each of the length direction folding back end portions of the plurality of tape portions.

As a result, a comprehensive bending strength of the pair of folding back portions is low compared to that of the end portions in the length direction of the tape portions, making it possible to readily fold the tape body at the folding back portions. Furthermore, the fold is less likely to be inclined, making it possible to favorably prevent displacement of the tape portions.

In the tape assembly, preferably the connecting portion is formed having a width that is less than a width obtained by subtracting a width of each of the openings from a width of each of the length direction folding back end portions of the plurality of tape portions where the connecting portion is connected.

As a result, even when the openings are formed near both ends of each of the tape portions, the bending strength of the connecting portion is also low with respect to the portions provided with the openings of the tape portion, making it possible to reliably fold the tape body at the connecting portion and not at the portions of the openings.

In the tape assembly, preferably the connecting portion is machined such that, when the connecting portion having a folded shape is in an open state, a projection is formed projecting outwardly when the connecting portion is folded back, in a thickness direction of the plurality of tape portions when the connecting portion is folded back.

As a result, folding at the connecting portion can be easily achieved.

In the tape assembly, when, among end portions in the length direction of the plurality of tape portions, end portions in the length direction where the connecting portion is disposed are called length direction folding back end portions, preferably the connecting portion has a width at a folded location that is less than a width of the connecting portion at a location connected with the length direction folding back end portions of the plurality of tape portions.

As a result, folding can be reliably performed at the portion of the connecting portion having a small width, making it possible to align the positions of the end portions of the tape portions with greater precision.

In the tape assembly, preferably the plurality of tape portions are fixed to each other at both ends of the plurality of tape portions at fixing portions.

Accordingly, folding is performed at the connecting portion, making it possible to maintain the aligned state of both end portions in the length direction of the tape portions. As a result, in a step of attaching the tape assembly to the rotary connector, the handling of the tape assembly is easy.

In the tape assembly, preferably the fixing portions are each disposed on a side opposite to the connecting portion sandwiching each of the openings.

As a result, locations away from the connecting portion can be fixed together, making it possible to more favorably prevent displacement of the end portions in the length direction of the tape portions.

According to a second aspect of the present invention, a rotary connector that includes the tape assembly is provided.

This makes it possible to achieve a rotary connector that has high quality and is easy to manufacture.

According to a third aspect of the present invention, a method for manufacturing a tape assembly configured to be attached to a rotary connector such as below is provided. That is, this manufacturing method includes the steps of creating a tape body, and folding. In the creating a tape body, a single tape body is created. The tape body integrally includes a plurality of tape portions differing in length in a length direction, and a connecting portion connecting the plurality of tape portions to each other at end portions in a length direction of the plurality of tape portions. The plurality of tape portions each include openings near both ends of each of the plurality of tape portions, the openings being configured to allow the tape body to be attached to the rotary connector. In the folding, the tape body is folded back at the connecting portion.

Accordingly, both ends of the tape portions differing in length can be aligned by a simple task. As a result, it is possible to improve quality by decreasing displacement between the tape portions, and simplify the work process.

DESCRIPTION OF EMBODIMENTS

Embodiments of the present invention will be described next with reference to the drawings.

Figure 1:
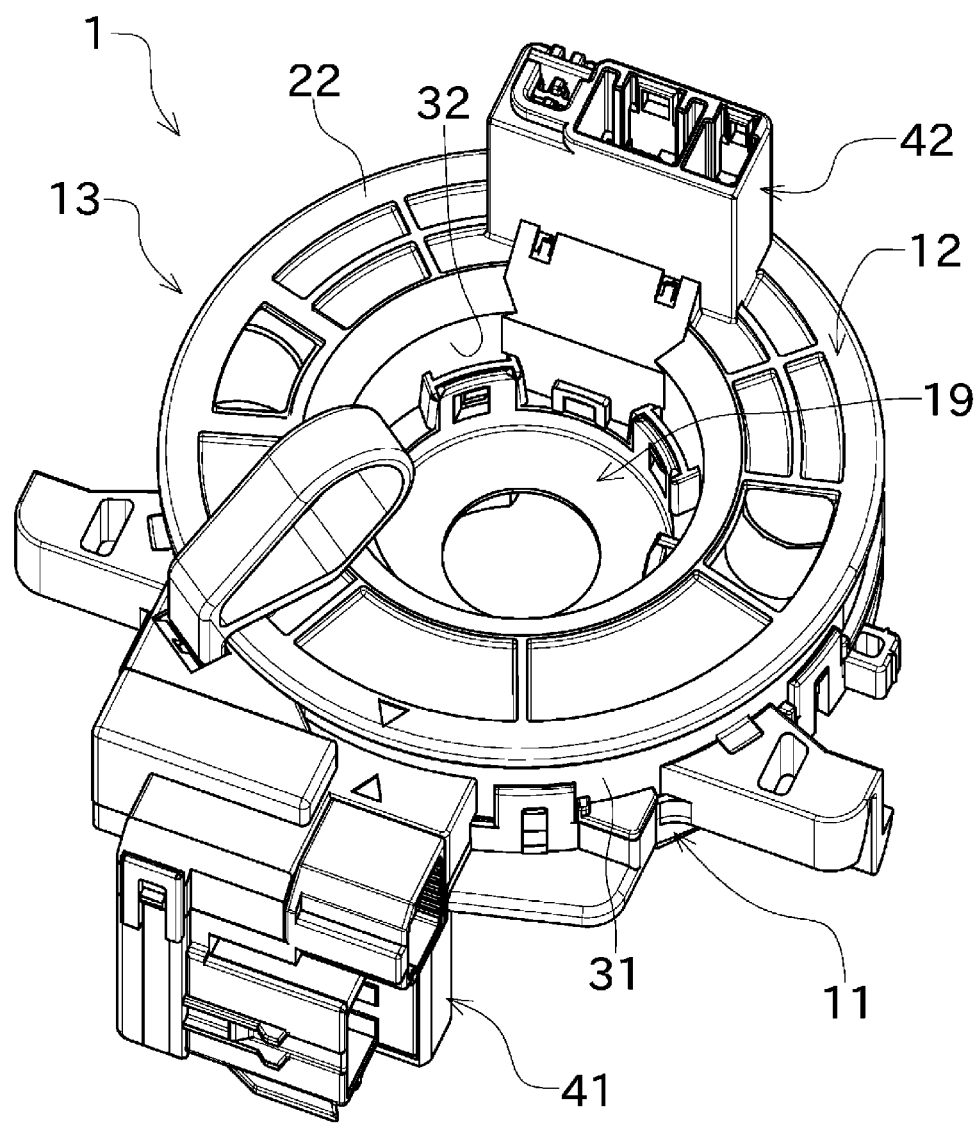
FIG. 1 is a general perspective view of a rotary connector that houses a dummy tape assembly according to a first embodiment.
Figure 2:
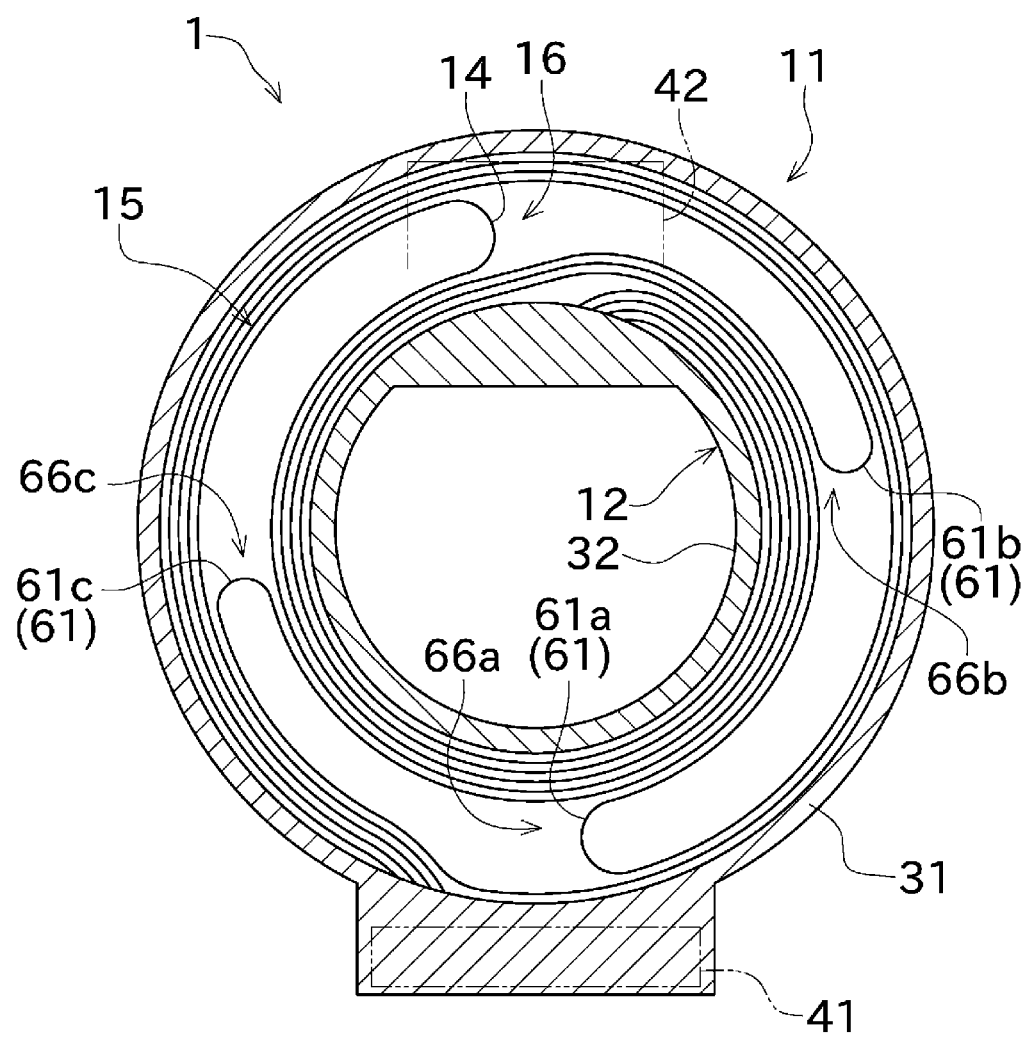
FIG. 2 is a schematic planar cross-sectional view illustrating the state of an interior of a case of the rotary connector.

First, a description will be given of an embodiment of a rotary connector 1 that houses a tape assembly according to the present invention with reference to FIGS. 1 and 2. FIG. 1 is a general perspective view of a rotary connector 1 that houses a dummy tape assembly (tape assembly) 60 according to a first embodiment. FIG. 2 is a schematic planar cross-sectional view illustrating the state of an interior of a case 13 of the rotary connector 1.

As illustrated in FIG. 1, the rotary connector 1 of the present embodiment includes the case 13. The case 13 includes a stator 11 and a rotator 12 capable of rotating relative to each other.

The rotary connector 1 of the first embodiment is a device for electrically connecting members that rotate relative to each other, such as a steering wheel and a steering column of an automobile, for example. The stator 11 is fixed to the steering column (not illustrated). An insertion hole 19 having a through-hole shape is formed in a center of the case 13, and a steering shaft (not illustrated) supported by the steering column is inserted into this insertion hole 19. The rotator 12 is configured to integrally rotate with the steering shaft (steering wheel). The rotator 12 can rotate about the same axis line as that of an axis of rotation of the steering shaft relative to the stator 11.

As illustrated in FIG. 1, the stator 11 includes a first connector 41. The rotator 12 includes a second connector 42. The second connector 42 integrally rotates with the rotation of the rotator 12. The connectors 41, 42 are each configured to be connectable to a cable (not illustrated) drawn from an external electric circuit (a horn switch, an airbag module, a power source, or the like, for example). Then, the first connector 41 and the second connector 42 are electrically connected to each other by a flat cable (flexible flat cable) disposed in the interior of the case 13.

The stator 11 includes an outer cylindrical portion 31 having a cylindrical shape. Furthermore, the rotator 12 includes a rotating-side ring plate 22 formed into a ring shape, and an inner cylindrical portion 32 that has a cylindrical shape and extends perpendicularly from an inner edge of this rotating-side ring plate 22.

The inner cylindrical portion 32 is disposed inward of the outer cylindrical portion 31, and the outer cylindrical portion 31 and the inner cylindrical portion 32 are disposed facing each other in a radial direction. According to the above configuration, as illustrated in FIG. 2, a housing space 15 that is a space having an annular shape surrounded by the outer cylindrical portion 31 and the inner cylindrical portion 32 is formed.

A flat cable 14 and three dummy tape portions (tape portions) 61 are housed inside the housing space 15.

The flat cable 14 is housed wound like a swirl inside the housing space 15. Specifically, with the first connector 41 serving as the starting point, the flat cable 14 is wound clockwise along an inner peripheral surface of the outer cylindrical portion 31, wound counterclockwise along an outer peripheral surface of the inner cylindrical portion 32 with a reversing portion 16 that folds back substantially in a U shape therebetween, and then connected to the second connector 42. With this flat cable 14, the first connector 41 of the stator 11 and the second connector 42 of the rotator 12 are electrically connected.

Furthermore, the rotary connector 1 of the first embodiment includes the three dummy tape portions 61 in addition to the flat cable 14 described above. The three dummy tapes are a first dummy tape portion 61a, a second dummy tape portion 61b, and a third dummy tape portion 61c, and these are integrally formed as the dummy tape assembly (tape assembly) 60 as described later.

The dummy tape portions 61 are each obtained by forming a synthetic resin such as polyethylene terephthalate (PET), for example, into a film shape, and are each formed into a strip shape having substantially the same width as that of the flat cable 14. The dummy tape portions 61 do not have the function of electrically connecting the first connector 41 and the second connector 42, and therefore are each referred to as a dummy cable (cable without an electrical conductor).

The dummy tape portions 61 are wound like a swirl inside the housing space 15 in the same manner as the flat cable 14. That is, the first dummy tape portion 61a, the second dummy tape portion 61b, and the third dummy tape portion 61c are each attached at one end thereof to an area near the location where the flat cable 14 is fixed to the outer cylindrical portion 31, and attached at the other end thereof to an area near the location where the flat cable 14 is fixed to the inner cylindrical portion 32. The first dummy tape portion 61a, the second dummy tape portion 61b, and the third dummy tape portion 61c are wound clockwise along the inner peripheral surface of the outer cylindrical portion 31 from the location fixed to the outer cylindrical portion 31, respectively reversed at reversing portions 66a, 66b, 66c that fold back substantially in a U shape, wound counterclockwise along the outer peripheral surface of the inner cylindrical portion 32, and then made to reach the location fixed to the inner cylindrical portion 32. The reversing portion 16 of the flat cable 14 and the reversing portions 66a, 66b, 66c of the dummy tape portions 61a, 61b, 61c are disposed side by side at intervals in the circumferential direction, dividing the housing space 15 into four equal sections.

The dummy tape portions 61 are film-shaped members made from a synthetic resin, and therefore have a certain degree of elasticity. The flat cable 14 is wound together with the dummy tape portions 61 and housed inside the housing space 15, and is therefore pressed onto the inner cylindrical portion 32 and the outer cylindrical portion 31 by an elastic force of the dummy tape portions 61. As a result, an effect of preventing shakiness or the like of the flat cable 14 inside the housing space 15 is achieved. Furthermore, the reversing portion 16 of the flat cable 14 and the reversing portions 66a, 66b, 66c of the dummy tape portions 61a, 61b, 61c are disposed evenly in the circumferential direction. Thus, a substantially rotationally symmetric configuration is achieved as a whole, making it possible to smoothly rotate the steering wheel without catching or the like during operation.

Figure 3:
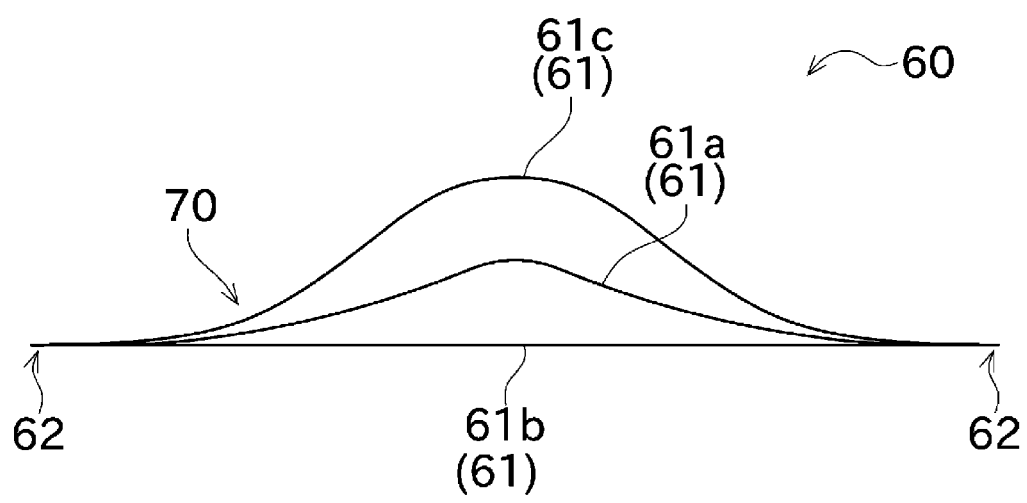
FIG. 3 is a side view illustrating an overall configuration of the dummy tape assembly of the first embodiment.
Figure 4:
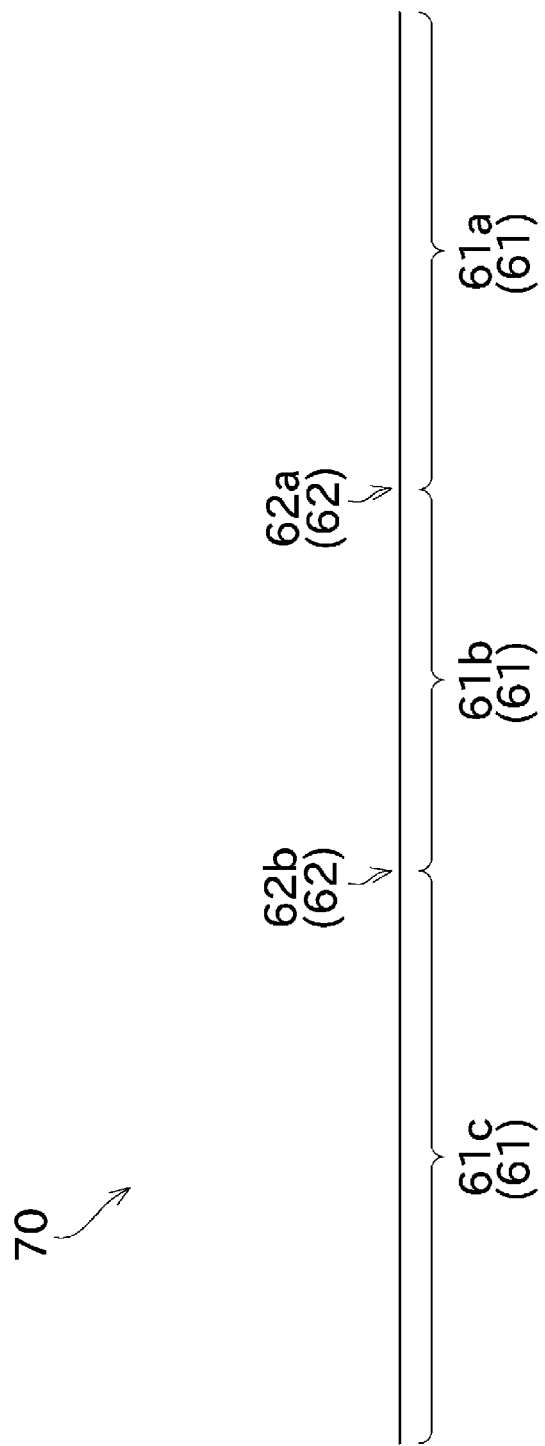
FIG. 4 is a side view illustrating a tape body before folding at folding back portions.
Figure 5:
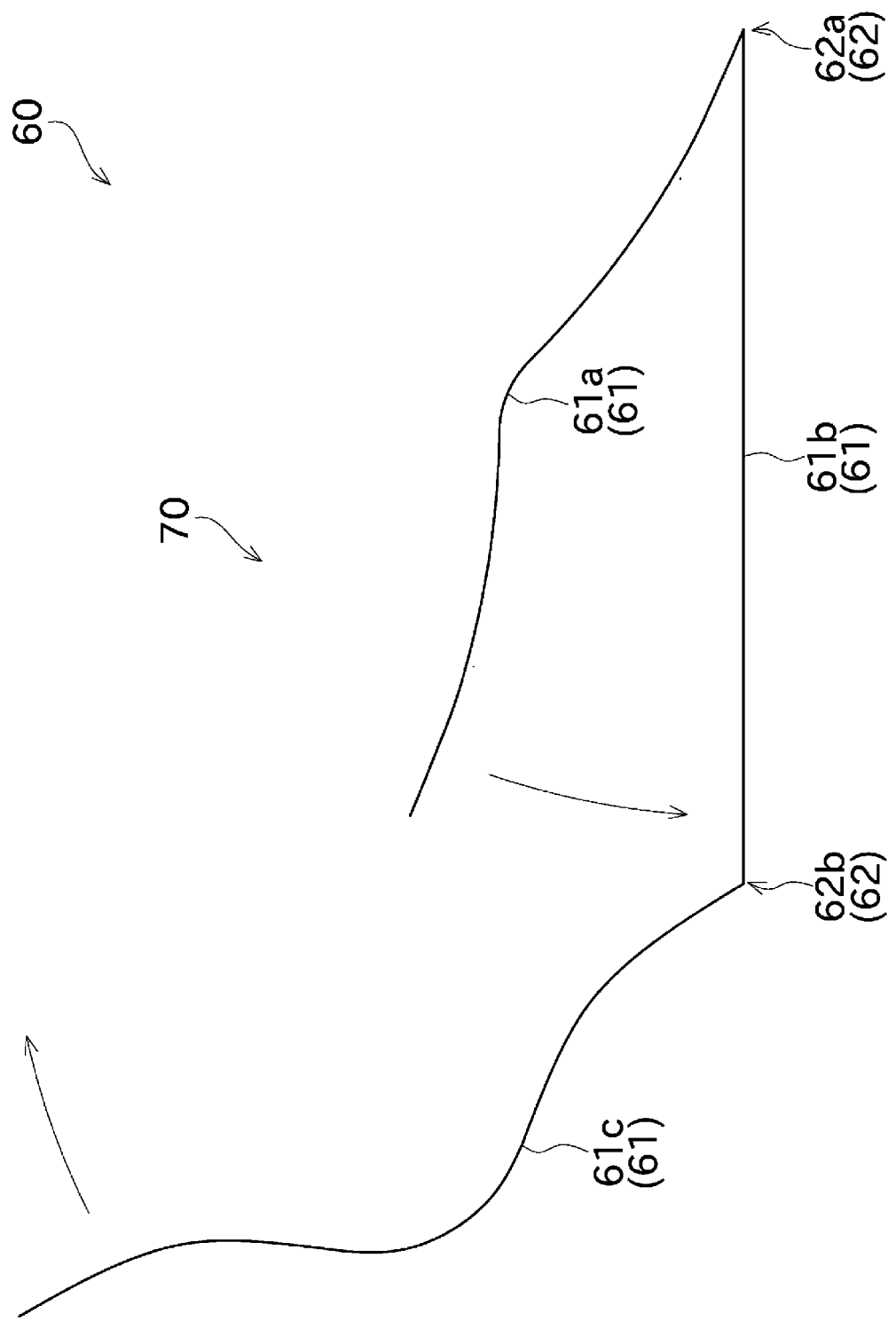
FIG. 5 is a side view for explaining a task of folding the tape body at the folding back portions.
Figure 6:
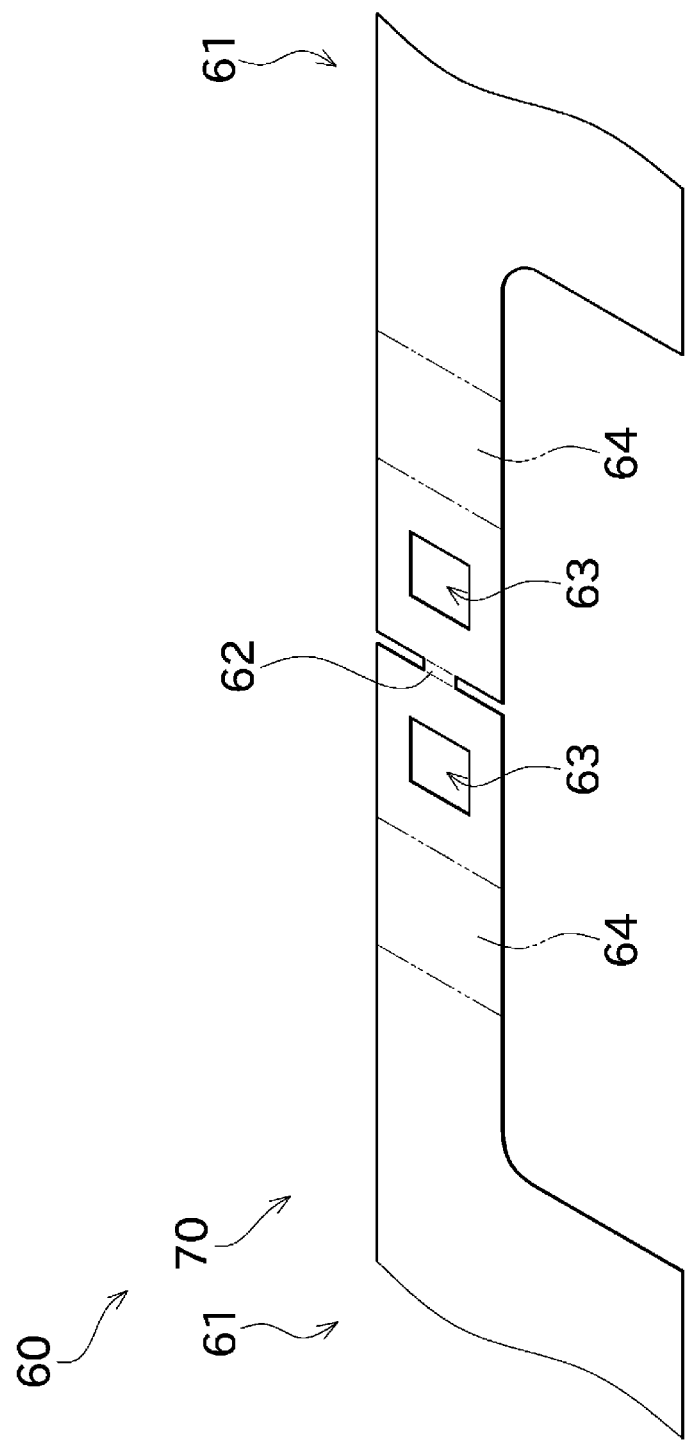
FIG. 6 is a perspective view illustrating a portion at and near the folding back portion before folding.

Next, a description will be given of the dummy tape assembly 60 of the present embodiment with reference to FIGS. 3 to 6. FIG. 3 is a side view illustrating an overall configuration of the dummy tape assembly 60 of the present embodiment. FIG. 4 is a side view illustrating a tape body 70 before folding at folding back portions 62. FIG. 5 is a side view for explaining a task of folding the tape body 70 at the folding back portions 62. FIG. 6 is a perspective view illustrating a portion at and near the folding back portions 62 before folding.

As illustrated in FIG. 3, the dummy tape assembly 60 of the present embodiment includes the tape body 70 provided with a plurality (three) of the dummy tape portions 61, and the folding back portions (connecting portions) 62 disposed between the dummy tape portions 61, integrally formed therein. Note that the tape body 70 before folding at the folding back portions 62 is illustrated in FIG. 4.

Specifically, the tape body 70 is formed into a long, slender tape shape as illustrated in FIG. 4, and the first dummy tape portion 61a, the folding back portion 62a, the second dummy tape portion 61b, the folding back portion 62b, and the third dummy tape portion 61c are disposed in that order from one end side of the single continuous tape body 70 in the length direction. Specifically, the folding back portion 62a is disposed so that the end portion in the length direction of the first dummy tape portion 61a and the end portion in the length direction of the second dummy tape portion 61b are connected, thereby making the first dummy tape portion 61a, the folding back portion 62a, and the second dummy tape portion 61b continuous. Furthermore, the folding back portion 62b is disposed so that the end portion in the length direction of the second dummy tape portion 61b and the end portion in the length direction of the third dummy tape portion 61c are connected, thereby making the second dummy tape portion 61b, the folding back portion 62b, and the third dummy tape portion 61c continuous. Thus, the dummy tape assembly 60 illustrated in FIG. 3 is configured by folding the continuous single tape body 70 at each of the folding back portions 62a, 62b as illustrated in FIG. 5.

With the positions of the reversing portions 66a, 66b, 66c of the respective dummy tape portion 61 differing in the circumferential direction with the dummy tape assembly 60 attached to the rotary connector 1, the three dummy tape portions 61 are configured to have different lengths. Specifically, the lengths of the second dummy tape portion 61b, the first dummy tape portion 61a, and the third dummy tape portion 61c are configured to increase in that order. That is, among the three dummy tape portions 61a, 61b, 61c disposed in the tape body 70, the second dummy tape portion 61b positioned in a center position in the length direction of the tape body 70 is configured to be shortest.

FIG. 6 illustrates the configuration in a portion at and near the end portions of the dummy tape portions 61 connected by the folding back portion 62, in an enlarged manner. As illustrated in FIG. 6, an attachment hole 63 and a welding portion (fixing portion) 64 are disposed near one end and the other end of each of the dummy tape portions 61 in the length direction.

The attachment hole 63 is for attaching the dummy tape portion 61 to the rotary connector 1, and is configured as a hole that has a rectangular shape and extends through the dummy tape portion 61 in a thickness direction. The attachment holes 63 formed in both ends of the three dummy tape portions 61 are configured to have the same shape, and are disposed in positions equidistant from the end portions in the length direction of the dummy tape portions 61. Thus, with both end portions of the three dummy tape portions 61 aligned as illustrated in FIG. 3, the positions of the attachment holes 63 coincide.

Note that, although not illustrated, projections (attachment portions) insertable into the attachment holes 63 are provided to the aforementioned outer cylindrical portion 31 and inner cylindrical portion 32. This projection is inserted and fixed in the attachment hole 63, making it possible to attach the dummy tape assembly 60 inside the housing space 15.

The welding portions 64 are for welding and fixing both end portions of the dummy tape portion 61, and are each disposed in a position on a central side of the attachment hole 63 in the length direction of the dummy tape portion 61. The welding portions 64, similar to the attachment holes 63, are disposed in corresponding positions between the three dummy tape portions 61. Thus, with both end portions of the three dummy tape portions 61 aligned as illustrated in FIG. 3, the positions of the welding portions 64 coincide. Note that the welding portion 64 (the range between the two dot chained lines) illustrated in FIG. 6 and the like may be welded as a whole, or just partially welded (near the center portion, for example) within a range of the welding portion 64.

Both end portions of each of the dummy tape portions 61 are formed so that the widths narrow in order to avoid interference with a structure (not illustrated) disposed in the housing space 15. Then, the attachment holes 63 and the welding portions 64 are disposed in the portions where the widths narrow. Note that while FIG. 6 illustrates the end portions in the length direction of the dummy tape portions 61 connected by the folding back portion 62, the attachment hole 63 and the welding portion 64 are disposed in the end portion in the length direction of the dummy tape portion 61 not provided with the folding back portion 62 as well. The shapes of the portion where the width of the dummy tape portion 61 narrows (including the welding portion 64), the folding back portion 62, and the attachment hole 63 can be realized by punch machining the tape body 70 with a die, for example.

Figure 7:
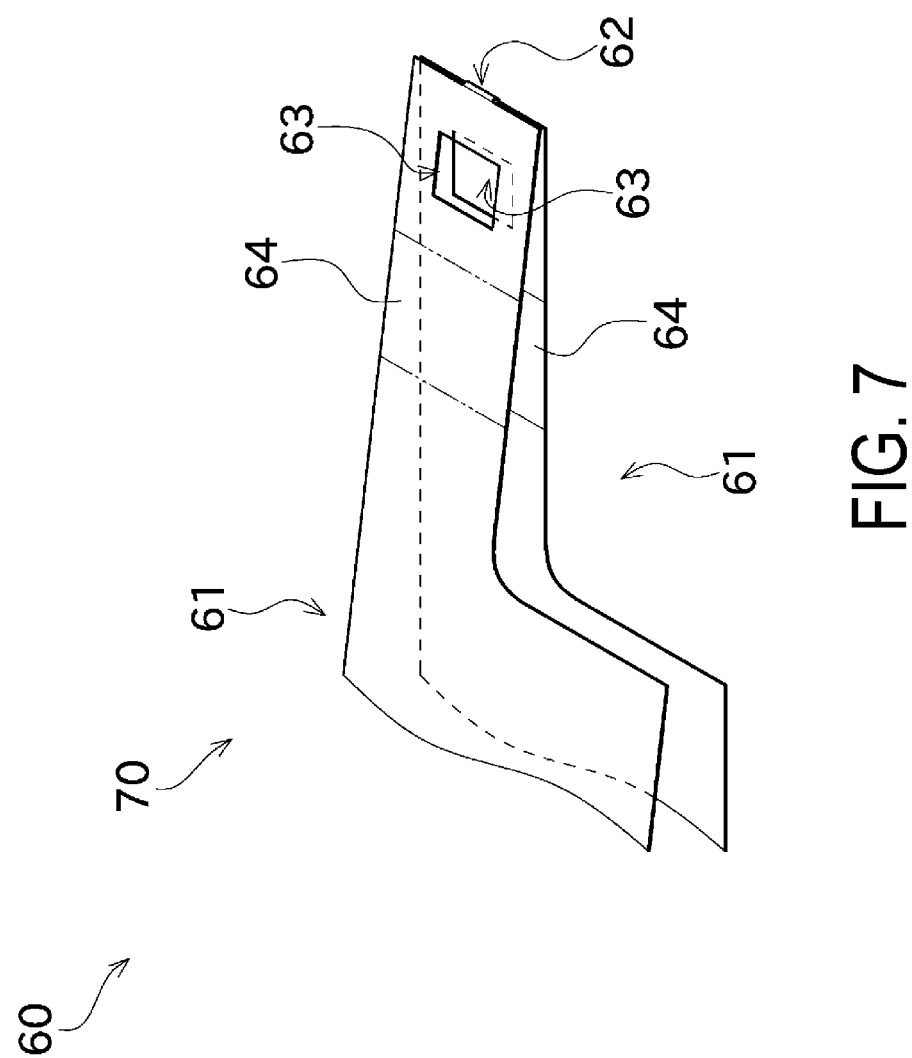
FIG. 7 is a perspective view illustrating a portion at and near the folding back portion after folding.

The folding back portion 62, as illustrated in FIG. 6, is disposed connecting the end portions in the length direction of the dummy tape portions 61. In the description below, the end portion in the length direction of the dummy tape portion 61 that connects with the folding back portion 62 in this way (in other words, the end portion in the length direction where the folding back portion 62 is disposed) is also called the "length direction folding back end portion". The folding back portion 62 is formed to make folding easy compared to the portion of the dummy tape portion 61. Specifically, as illustrated in FIG. 6, a width of the folding back portion 62 is less than a width of the length direction folding back end portion of the dummy tape portion 61, making the folding back portion 62 easier to fold than the end portion of the dummy tape portion 61. Thus, the dummy tape assembly 60 (tape body 70) of the present embodiment folds from an original straight state (the state of FIG. 4) as illustrated in FIGS. 5 and 7, making it possible to achieve the 180° folded state (the state of FIG. 3) at the folding back portion 62. This folding may be performed manually by an assembly worker or automatically by a machine. Note that the configuration of the folding back portion 62 can be variously modified. Details will be described later.

The length of the folding back portion 62 in the length direction of the dummy tape portion 61 is formed sufficiently short, making it possible to favorably align the positions of the length direction folding back end portions of the dummy tape portions 61 as illustrated in FIG. 7 in the state after folding. As a result, in the tape body 70 illustrated in FIG. 5, the end portion on the folding back portion 62a side of the first dummy tape portion 61a and the end portion on the folding back portion 62a side of the second dummy tape portion 61b can be easily aligned. Furthermore, the end portion on the folding back portion 62b side of the second dummy tape portion 61b and the end portion on the folding back portion 62b side of the third dummy tape portion 61c can be easily aligned. Furthermore, the end portion on the side where the folding back portion 62 is not formed in the first dummy tape portion 61a is sandwiched between the second dummy tape portion 61b and the third dummy tape portion 61c and abuts against the folding back portion 62b. In this portion, the end portions in the length direction of the three dummy tape portions 61a, 61b, 61c can be maintained in an aligned state.

The end portion on the side where the folding back portion 62 is not formed in the third dummy tape portion 61c is aligned with the end portions of the first dummy tape portion 61a and the second dummy tape portion 61b connected to each other by the folding back portion 62a using an appropriate jig or the like. In this state, the welding portions 64 formed at both end portions of the respective dummy tape portions 61 are ultrasonically welded together. With the above, both end portions of the three dummy tape portions 61 can be fixed. Note that the welding between the dummy tape portions 61 may be performed using high frequency welding, thermal welding, or the like in place of ultrasonic welding.

With the above, the dummy tape assembly 60 can be manufactured and this dummy tape assembly 60 can be attached to the projections provided on the outer cylindrical portion 31 and the inner cylindrical portion 32 of the rotary connector 1 with the attachment holes 63 formed in the respective dummy tape portions 61 inserted with the projections.

Figure 14:
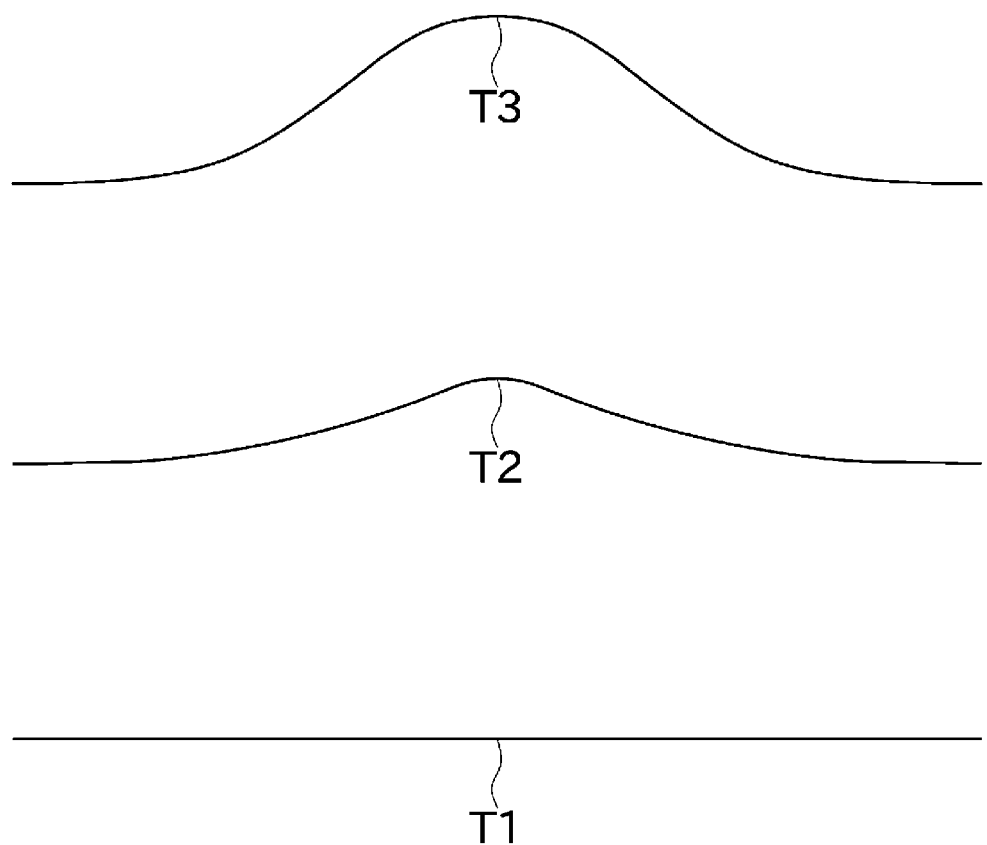
FIG. 14 is a side view illustrating a known dummy tape.

As described above, in the manufacture of the dummy tape assembly 60 using the straight tape body 70 in the present embodiment, the location where the assembly worker is required to actively align the end portion of the dummy tape portion 61 with the other end portions of the dummy tape portions 61 can be set to just the end portion on the side where the folding back portion 62 is not formed in the third dummy tape portion 61c. This makes it possible to simplify the steps of manufacturing the dummy tape assembly 60. That is, as illustrated in FIG. 14, in the related art, three tapes T1, T2, T3 differing in length are prepared as separate parts, and both end portions of these tapes T1, T2, T3 are overlapped in an aligned state, and ultrasonically welded. As a result, displacement readily occurs between the three tapes T1, T2, T3, leading to a decrease in a welding surface area and a decrease in a welding strength in an amount corresponding to the amount of displacement, potentially causing the welded portions to peel. In the present embodiment, the portions connected by the folding back portion 62 are folded at the folding back portion 62, making it possible to favorably align the positions of the end portions of the dummy tape portions 61. As a result, the displacement of the welding portions 64 is virtually eliminated, making it possible to stably achieve an adequate welding strength. Moreover, the dummy tape assembly 60 can be manufactured from the single continuous tape body 70, making it possible to decrease the quantity of parts and eliminating the possibility that parts scatter during manufacture, simplifying handling.

Figure 8:
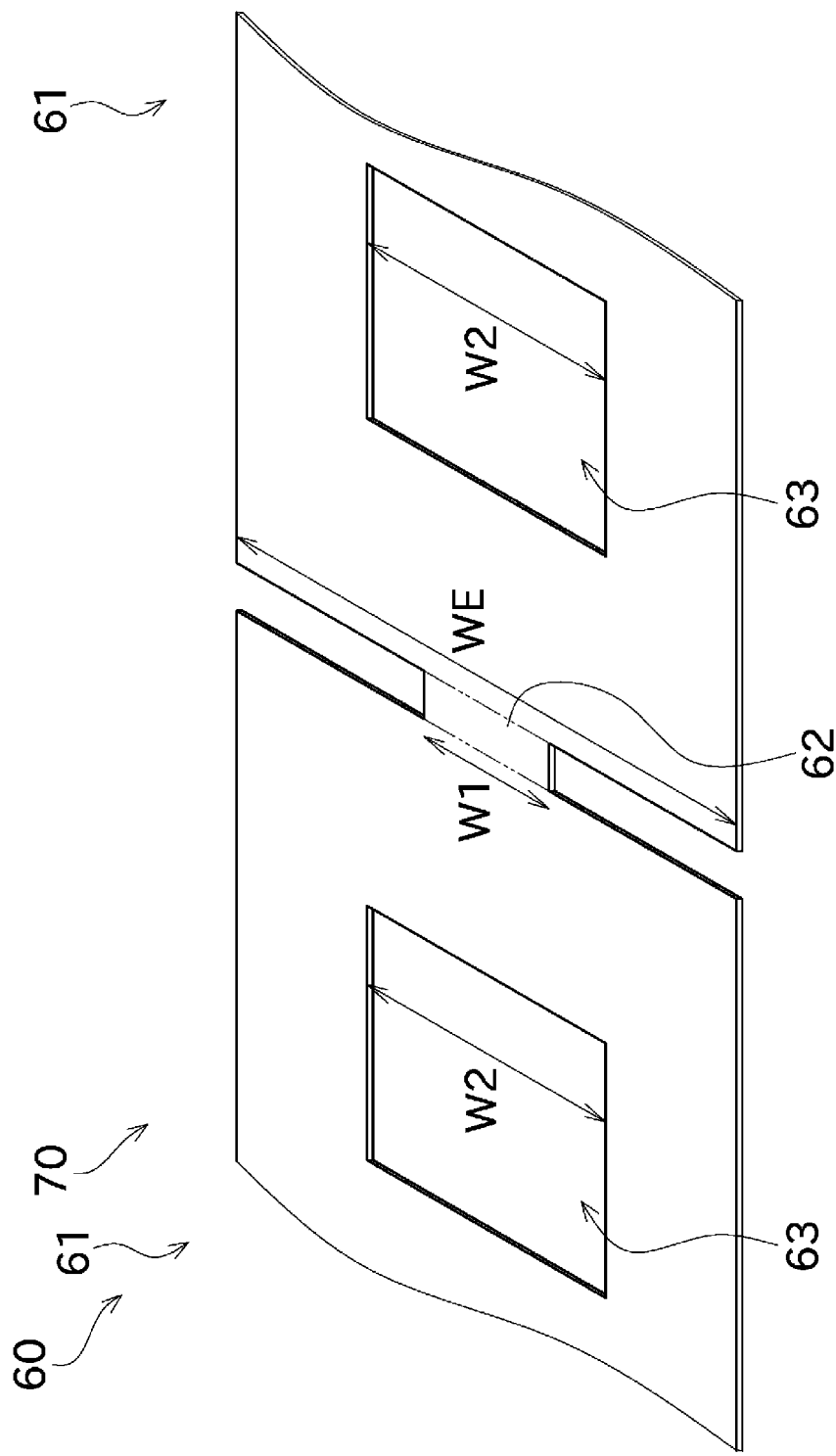
FIG. 8 is an enlarged perspective view illustrating the folding back portion illustrated in FIG. 6 in detail.
Figure 9:
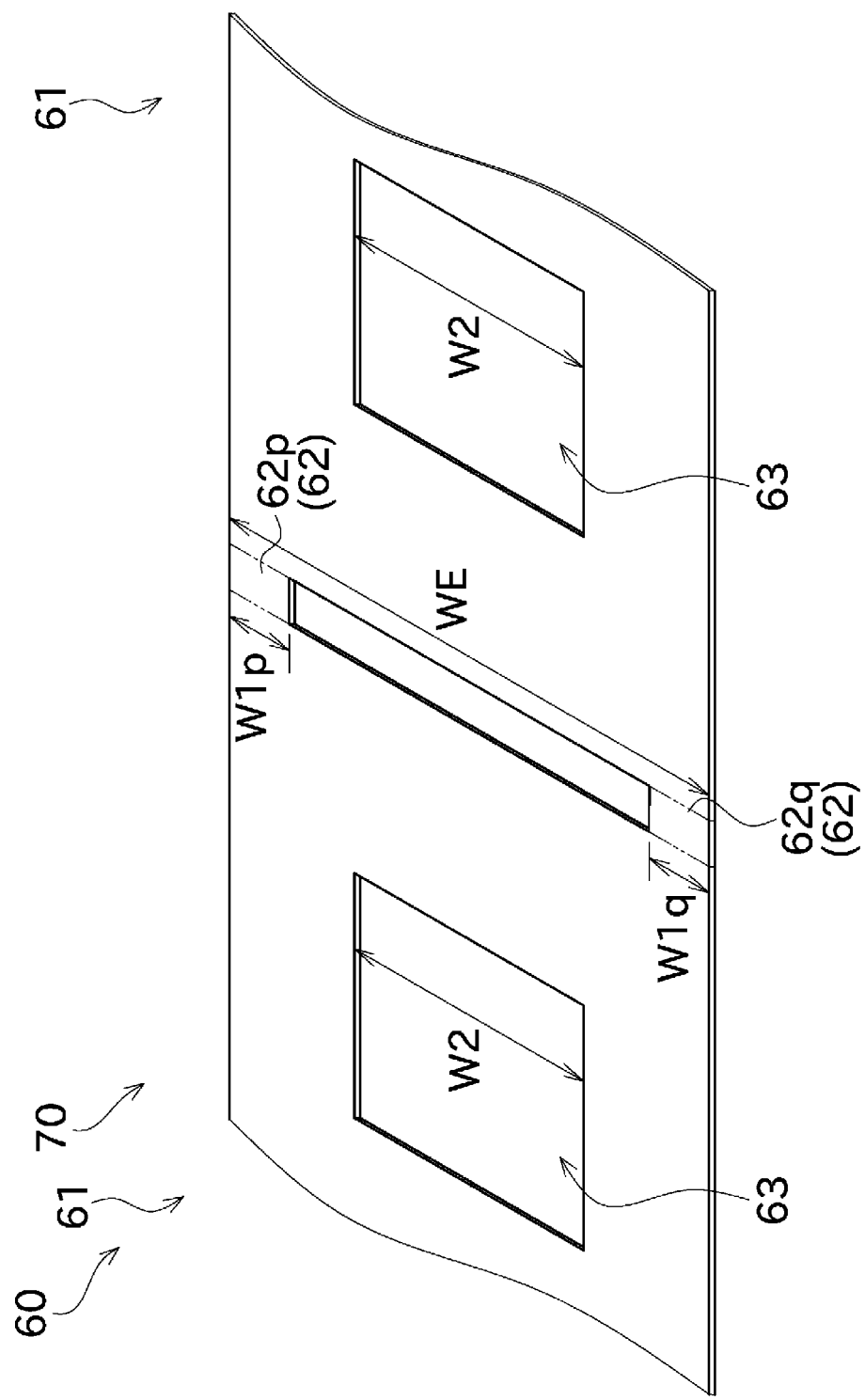
FIG. 9 is an enlarged perspective view illustrating another example of the folding back portion.
Figure 10:
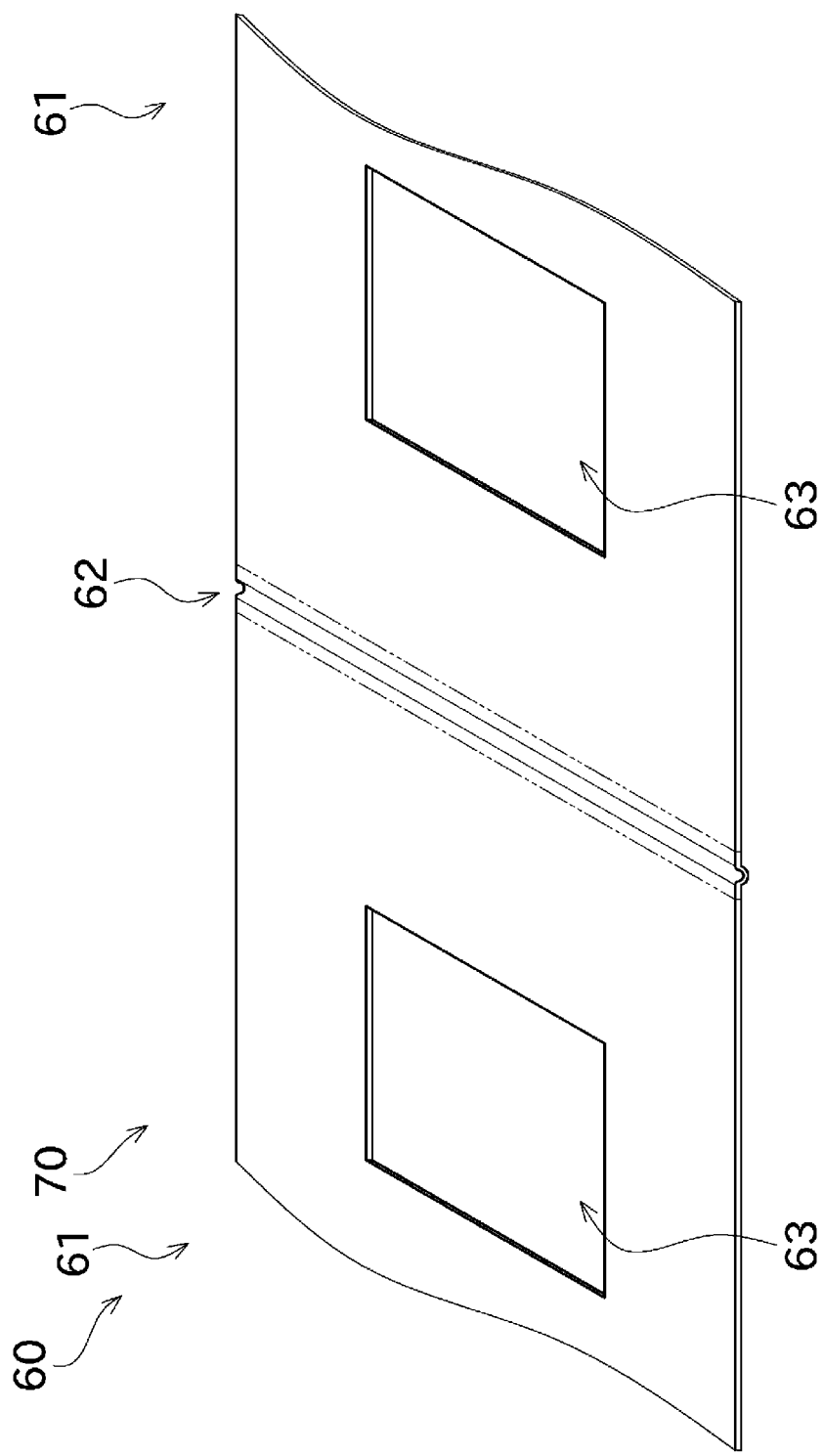
FIG. 10 is an enlarged perspective view illustrating yet another example of the folding back portion.
Figure 11:
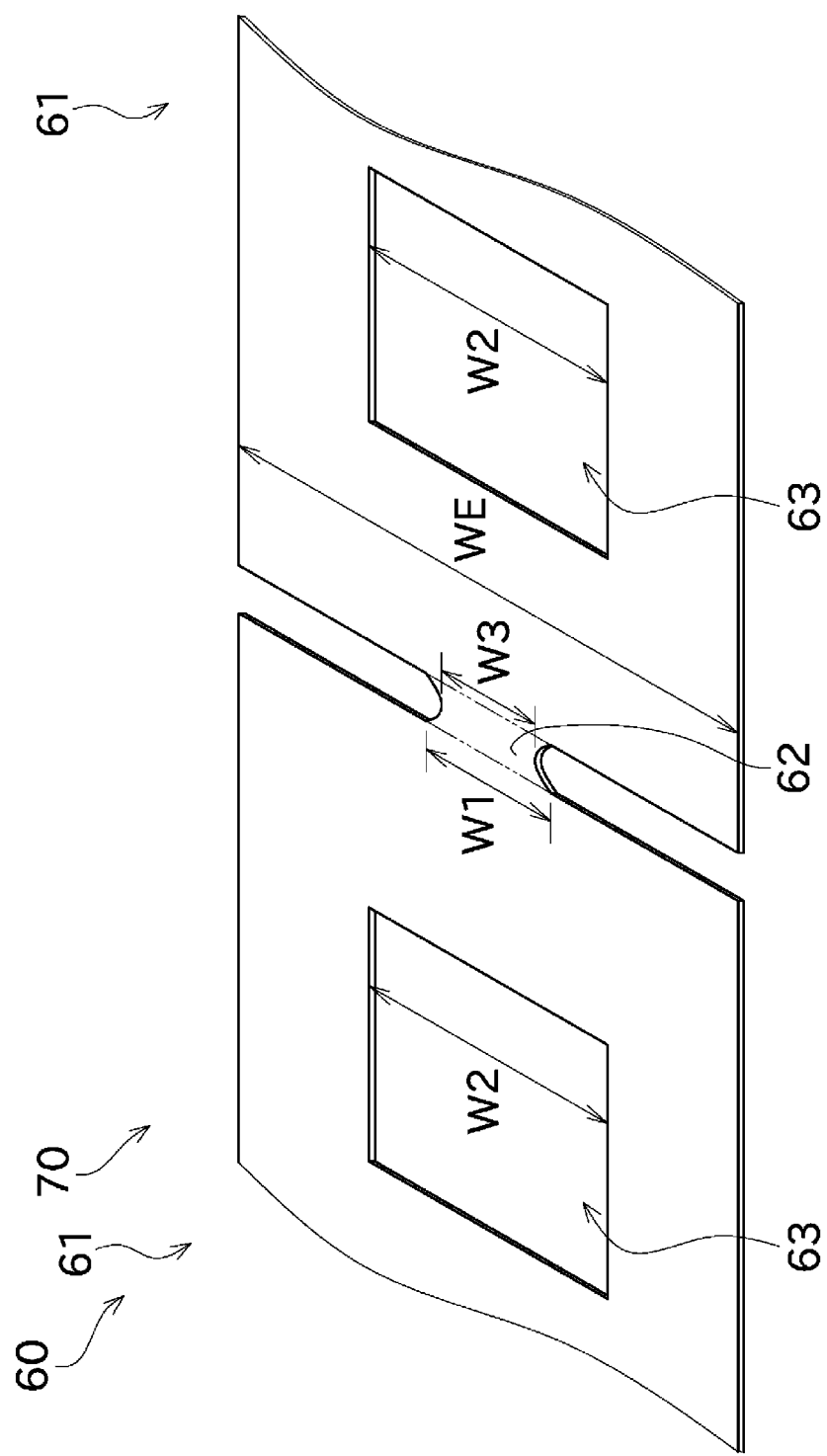
FIG. 11 is an enlarged perspective view illustrating a modified example of the folding back portion in FIG. 8.
Figure 12:
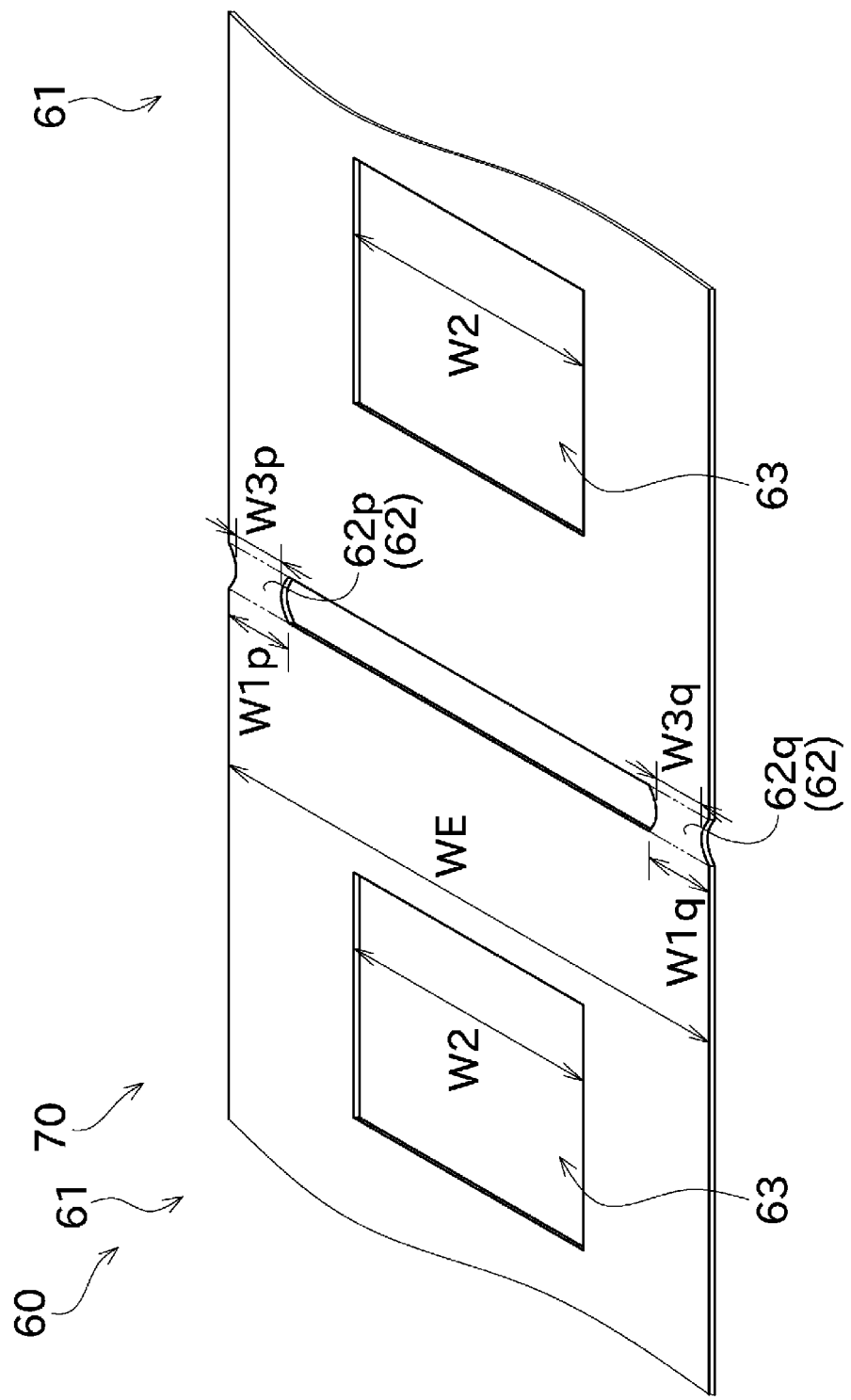
FIG. 12 is an enlarged perspective view illustrating a modified example of the folding back portion illustrated in FIG. 9.

Next, various examples of the shape of the folding back portion 62 will be described with reference to FIGS. 8 to 12. FIG. 8 is an enlarged perspective view illustrating the folding back portion 62 illustrated in FIG. 6 in detail. FIG. 9 is an enlarged perspective view illustrating another example of the folding back portion 62. FIG. 10 is an enlarged perspective view illustrating yet another example of the folding back portion 62. FIG. 11 is an enlarged perspective view illustrating a modified example of the folding back portion 62 in FIG. 8. FIG. 12 is an enlarged perspective view illustrating a modified example of the folding back portion 62 illustrated in FIG. 9.

In the dummy tape assembly 60 illustrated in FIG. 8, the folding back portion 62 is disposed connecting the length direction folding back end portions of the dummy tape portions 61 to each other at center portions in the width direction of the length direction folding back end portions. Furthermore, the folding back portion 62 is formed having a width W1 that is less than a width WE of the length direction folding back end portions of the dummy tape portions 61 (W1<WE). Thus, the bending strength of the folding back portion 62 is low, making it easy to fold the tape body 70 with that portion serving as the boundary. This allows the positions of the end portions of the dummy tape portions 61 to be reliably aligned.

Note, as illustrated in FIG. 9, two folding back portions 62p, 62q are disposed connecting the length direction folding back end portions of the dummy tape portions 61 to each other at both end portions in the width direction of the length direction folding back end portions. Furthermore, the folding back portions 62p, 62q are each preferably formed having respective widths W1p, W1q that are less than ½ of the width of the length direction folding back end portions of the dummy tape portions 61 (W1p<WE/2, W1q<WE/2). Thus, similar to the case in FIG. 8, the tape body 70 is readily folded with the portions of the folding back portions 62 serving as boundaries, making it possible to reliably align the positions of the end portions of the dummy tape portions 61. Furthermore, the folds are less likely to be inclined compared to the case in FIG. 8, making it possible to favorably prevent displacement of the dummy tape portions 61 in this sense as well.

In the dummy tape assembly 60 illustrated in FIGS. 8 and 9, the folding back portion 62 is formed having the width that is less than a width obtained by subtracting a width of the attachment hole 63 from a width of the end portions of the dummy tape portion 61 connected with the folding back portion 62. Specifically, according to the configuration in FIG. 8, the folding back portion 62 is formed having the width W1 that is less than a width obtained by subtracting a width W2 of the attachment hole 63 from the width WE of the length direction folding back end portion of the dummy tape portions 61 connected with the folding back portion 62 (W1<WE−W2). Furthermore, according to the configuration in FIG. 9, the two folding back portions 62p, 62q are formed having a total width (W1p+W1q) that is less than a width obtained by subtracting the width W2 of the attachment hole 63 from the width WE of the length direction folding back end portion of the dummy tape portions 61 connected with the folding back portions 62p, 62q (W1p+W1q<WE−W2). As a result, even when the attachment holes 63 are each formed near the end portion of the dummy tape portion 61, the bending strength of the folding back portion 62 is low compared to the portion provided with the attachment hole 63, making it possible to reliably fold the dummy tape portion 61 at the folding back portion 62 and not at the portion provided with the attachment hole 63.

In the dummy tape assembly 60 illustrated in FIG. 10, the folding back portion 62 is machined, when the folding back portion 62 having the folded shape is in an open state (the state prior to bending at the folding back portion 62; the state in FIG. 4), a projection is formed on one side in the thickness direction of the dummy tape portion 61. This folding back portion 62 is formed so that the outer side forms the projection when folded, and the center of the folding back portion 62 in the length direction of the dummy tape portion 61 forms a vertex of the projection. According to this configuration as well, folding at the folding back portion 62 can be easily achieved.

Furthermore, in the dummy tape assembly 60 illustrated in FIGS. 11 and 12, the folding back portion 62 is formed having the width at the folded location that is less than a width at the locations that connect with the dummy tape portions 61.

Specifically, in the dummy tape assembly 60 in FIG. 11, one folding back portion 62 is disposed in a central portion in the width direction of the dummy tape portions 61. Furthermore, recessed portions that have a semicircular shape (arc shape or round shape) and recess toward the center in the width direction are formed in both ends in the width direction of the folding back portion 62. As a result, the folding back portion 62 is formed having a width W3 of the center portion in the length direction of the dummy tape portion 61 that is less than the width W1 at the location where the folding back portion 62 connects with the dummy tape portion 61 (W3<W1). Thus, the tape body 70 readily folds at the center portion of the folding back portion 62 in the length direction of the dummy tape portion 61, making it possible to align the end portions of the dummy tape portions 61 with even greater precision. Furthermore, the folding back portion 62 is formed having the width W1 at the location that connects with the dummy tape portion 61 that is less than the width W2 of the attachment hole 63 (W1<W2). As a result, the tape body 70 can be reliably folded at the location of the folding back portion 62 and not at the attachment hole 63. Note that, rather than being formed into an arc shape as described above, the recessed portion may be formed into a V shape, for example. Furthermore, rather than being formed at both ends in the width direction of the folding back portion 62, the recessed portion may be formed at only one end.

Furthermore, in the dummy tape assembly 60 in FIG. 12, the folding back portions 62p, 62q are disposed substantially at both end portions in the width direction of the dummy tape portion 61, with one at each end portion. Recessed portions that have a semicircular shape (arc shape or round shape) and recess toward the center in the width direction are formed in both ends in the width direction of the folding back portions 62p, 62q. As a result, the folding back portions 62p, 62q are formed having widths W3p, W3q of the center portion in the length direction of the dummy tape portion 61 that are less than widths W1p, W1q at the locations where the folding back portions 62p, 62q connect with the dummy tape portion 61 (W3p<W1p and W3q<W1q). Thus, the tape body 70 readily folds at the center portion of the folding back portion 62 in the length direction of the dummy tape portion 61, making it possible to align the end portions of the dummy tape portions 61 with even greater precision. Furthermore, the total of the widths W1p+W1q of the folding back portions 62p, 62q at the locations that connect with the dummy tape portion 61 is less than the width W2 of the attachment hole 63 (W1p+W1q<W2). As a result, the tape body 70 can be reliably folded at the location of the folding back portion 62 and not at the attachment hole 63. Note that, with the configuration in FIG. 12 as well, rather than being formed into an arc shape as described above, the recessed portion may be formed into a V shape, for example. Furthermore, rather than being formed at both ends in the width direction of the folding back portions 62p, 62q, the recessed portion may be formed at only one end. For example, among both end portions of the folding back portions 62p, 62q, the recessed portion may be formed at only the end portion that is close to the center of the dummy tape portion 61 in the width direction, or at only the end portion that is away from the center of the dummy tape portion 61 in the width direction.

Next, the welding of the dummy tape portions 61 will be described.

As described above, in the dummy tape assembly 60 of the present embodiment, the dummy tape portions 61a, 61b, 61c are overlapped in the thickness direction by being folded at the folding back portion 62. Then, with the positions of the respective both ends thereof aligned, the welding portions 64 provided to the respective both ends are ultrasonically welded together. As a result, the aligned state of both end positions of the dummy tape portions 61 can be maintained, making the task of attaching the dummy tape assembly 60 to the rotary connector 1 easier.

Furthermore, in the dummy tape assembly 60 of the present embodiment, the welding portions 64 are each disposed on the side opposite to the folding back portion 62, sandwiching the attachment holes 63. As a result, compared to when the welding portions 64 are disposed between the attachment hole 63 and the folding back portion 62, the distance between the welding portion 64 and the folding back portion 62 can be lengthened, making it possible to favorably bond the end portions of the dummy tape portions 61.

Next, a description will be given of the dummy tape assembly 60 of the present embodiment from the perspective of the manufacturing method. That is, the dummy tape assembly 60 is manufactured by a method that includes a tape body creating step, a folding step, and a welding step. In the tape body creating step, the tape body 70 integrally provided with the plurality of dummy tape portions 61 having differing lengths and the folding back portion 62 connecting the dummy tape portions 61 to each other is created by punch machining, for example. In the folding step, the tape body 70 is folded at the folding back portion 62. In the welding step, the welding portions 64 disposed at the end portions of the dummy tape portions 61 are fixed with the end portions aligned by welding. Through these steps, the dummy tape assembly 60 of the present embodiment can be manufactured.

As described above, the dummy tape assembly 60 of the present embodiment is configured to be attached to the rotary connector 1. The dummy tape assembly 60 includes the tape body 70 including the plurality of dummy tape portions 61 and the folding back portion 62 integrally formed therein. The plurality of dummy tape portions 61 differ in length in the length direction. The folding back portion 62 connects the dummy tape portions 61 to each other at end portions in the length direction of the dummy tape portions 61 in a folded state. The plurality of dummy tape portions 61 each include the attachment holes 63 near both ends in the length direction of each of the plurality of dummy tape portions 61, the openings being configured to allow the dummy tape body 70 to be attached to the rotary connector 1.

That is, in the related art, both ends of the plurality of tapes T1, T2, T3 differing in length are overlapped and attached to the rotary connector manually, readily causing displacement between the tapes when overlapped as well as complexities in the work process. According to the configuration of the present embodiment, the tape assembly 60 is configured by the single continuous tape body 70, and both end positions of the dummy tape portions 61 connected by the folding back portion 62 are aligned and overlapped, making it possible to improve quality by decreasing displacement between the dummy tape portions 61, and simplify the work process.

Furthermore, in the dummy tape assembly 60 having the configuration illustrated in FIG. 8, the folding back portion 62 is disposed connecting the length direction folding back end portions of the dummy tape portions 61 to each other at center portions in the width direction of the length direction folding back end portions. The folding back portion 62 is formed having the width W1 that is less than the width WE of (the length direction folding back end portion of) the dummy tape portion 61 (W1<WE).

As a result, the bending strength of the folding back portion 62 is low compared to that of the length direction folding back end portions of the dummy tape portions 61, making it possible to readily fold the tape body 70 at the folding back portion 62. Furthermore, the shape of the folding back portion 62 can be simplified.

Furthermore, in the dummy tape assembly 60 having the configuration illustrated in FIG. 9, the folding back portions 62p, 62q are disposed connecting the length direction folding back end portions of the dummy tape portions 61 to each other at both end portions in the width direction of the length direction folding back end portions. The folding back portions 62p, 62q are each formed having the respective widths W1p, W1q that are less than ½ of the width WE of (the length direction folding back end portion) of the dummy tape portion 61 (W1p<WE/2, W1q<WE/2).

As a result, the comprehensive bending strength of the pair of folding back portions 62p, 62q is low compared to that of the length direction holding back end portions of the dummy tape portions 61, making it possible to readily fold the tape body 70 at the folding back portions 62p, 62q. Furthermore, the folds are less likely to be inclined, making it possible to favorably prevent displacement of the dummy tape portions 61.

Furthermore, in the dummy tape assembly 60 having the configuration illustrated in FIG. 8, for example, the folding back portion 62 is formed having the width W1 that is less than the width obtained by subtracting the width W2 of the attachment hole 63 from the width WE of the length direction folding back end portion of the dummy tape portions 61 connected by the folding back portion 62 (W1<WE−W2).

As a result, even when the attachment holes 63 are formed near both ends of the dummy tape portions 61, the bending strength of the folding back portion 62 is low with respect to the portions of the dummy tape portion 61 provided with the attachment holes 63, making it possible to reliably fold the tape body 70 at the folding back portion 62 and not at the portions of the attachment holes 63.

Furthermore, in the dummy tape assembly 60 having the configuration illustrated in FIG. 10, the folding back portion 62 is machined, such that, when the folding back portion 62 having the folded shape is in an open state, the projection is formed projecting outwardly when the folding back portion 62 is folded back, in the thickness direction of the dummy tape portion 61.

As a result, folding at the folding back portion 62 can be easily achieved.

Furthermore, for example, in the dummy tape assembly 60 illustrated in FIG. 11, the folding back portion 62 is formed having the width W3 at the folded location that is less than the width W1 of the folding back portion 62 at the location that connects with the length direction folding back end portions of the dummy tape portions 61 (W3<W1).

As a result, the tape body 70 can be reliably folded at the portion of the folding back portion 62 having a small width, making it possible to align the positions of the end portions of the dummy tape portions 61 with greater precision.

Furthermore, in the dummy tape assembly 60 of the present embodiment, the plurality of dummy tape portions 61 are fixed each other at both ends of the plurality of dummy tape portions 61 at the welding portions 64.

Accordingly, the tape body 70 is folded at the folding back portion 62, making it possible to maintain the aligned state of both end portions in the length direction of the dummy tape portions 61. As a result, in the step of attaching the dummy tape assembly 60 to the rotary connector 1, the handling of the dummy tape assembly 60 is easy.

Furthermore, in the dummy tape assembly 60 of the present embodiment, the welding portions 64 are each disposed on the side opposite to the folding back portion 62, sandwiching the attachment holes 63.

As a result, locations away from the folding back portion 62 can be welded together, making it possible to more favorably prevent displacement of the end portions in the length direction of the dummy tape portions 61.

Furthermore, the rotary connector 1 of the present embodiment includes the dummy tape assembly 60.

This makes it possible to achieve the rotary connector 1 that has high quality and is easy to manufacture.

Furthermore, the dummy tape assembly 60 of the present embodiment is manufactured by a method that includes the steps of creating a tape body and folding. In the creating a tape body, the single tape body 70 is created. The tape body 70 integrally includes the plurality of dummy tape portions 61 differing in length in the length direction, and the folding back portion 62 connecting the tape portions 61 to each other at end portions in the length direction of the tape portions 61. The plurality of dummy tape portions 61 each include the attachment holes 63 near both ends of each of the dummy tape portion 61, the attachment holes 63 being configured to allow the tape body 70 to be attached to the rotary connector 1. In the folding, the tape body 70 is folded at the folding back portion 62.

Accordingly, both end portions of the dummy tape portions differing in length can be aligned by a simple task. As a result, it is possible to improve quality by decreasing displacement between the dummy tape portions 61, and simplify the work process.

Figure 13:
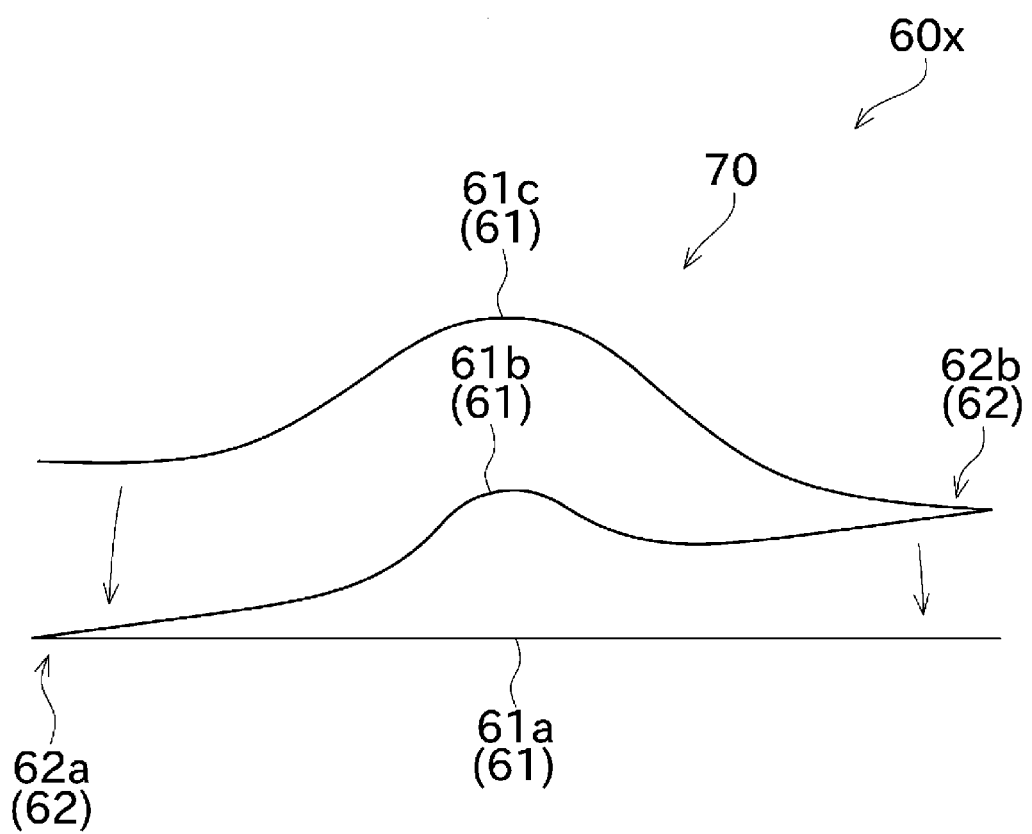
FIG. 13 is a side view for explaining a task of folding the tape body at the folding back portion in the dummy tape assembly of a second embodiment.

Next, a second embodiment will be described. FIG. 13 is a side view illustrating an overall configuration of a dummy tape assembly 60x of the second embodiment. Note that, in the description of the present embodiment, members that are the same as or similar to those in the above-described embodiment will be denoted in the drawings using the same reference numerals, and descriptions thereof may be omitted.

As illustrated in FIG. 13, in the dummy tape assembly 60x of the present embodiment, the first dummy tape portion 61a, the folding back portion 62a, the second dummy tape portion 61b, the folding back portion 62b, and the third dummy tape portion 61c are disposed in that order from one end of the tape body 70 in the length direction. However, unlike the first embodiment described above, the three dummy tape portions 61 are configured to increase in length in the order of the first dummy tape portion 61a, the second dummy tape portion 61b, and the third dummy tape portion 61c.

Furthermore, in the present embodiment, a folding direction of the folding back portion 62a and a folding direction of the folding back portion 62b are opposite each other, and the tape body 70 is folded in a zigzag shape as illustrated in FIG. 13.

With the dummy tape assembly 60x of the present embodiment as well, similar to the first embodiment described above, it is possible to improve quality by decreasing displacement between the dummy tape portions 61, and simplify the work process.

Although preferred embodiments of the present invention have been described thus far, the above-described configurations can be modified as follows, for example.

In the dummy tape assemblies 60, 60x, the three dummy tape portions 61a, 61b, 61c can be modified to various lengths.

While there are three dummy tape portions 61 in the dummy tape assemblies 60, 60x in the embodiments described above, the quantity is not limited to three. The effects of the above-described embodiments can be achieved as long as there are two or greater dummy tape portions 61, and therefore the quantity of dummy tape portions 61 may be two or four or greater.

The machining in which the folding back portion 62 is made into a projection in the thickness direction as illustrated in FIG. 10 may be applied to the configurations in FIGS. 8, 9, 11, and 12 as well. Furthermore, the configuration in which the width of the center portion of the folding back portion 62 in the length direction of the dummy tape portion 61 is decreased as illustrated in FIG. 11 and the like may be applied to the folding back portion 62 in FIG. 10 as well.

In place of the machining in which the portion of the folding back portion 62 is made into a projection in the thickness direction as illustrated in FIG. 10, machining that forms a V-shaped groove, for example, may be performed. In this case as well, folding at the folding back portion 62 can be easily achieved.

The positions and shapes of the attachment hole 63 are not limited to those in the embodiments described above, and may be modified as appropriate in accordance with circumstance.

REFERENCE SIGNS LIST

1 Rotary connector
60, 60x Dummy tape assembly (tape assembly)
61 (61a, 61b, 61c) Dummy tape (tape portion)
62 (62a, 62b) Folding back portion (connecting portion)
63 Attachment hole (opening)
64 Welding portion (fixing portion)

The invention claimed is:

1. A tape assembly configured to be attached to a rotary connector, comprising:
 a tape body comprising a plurality of tape portions and a connecting portion integrally formed in the tape body, the plurality of tape portions differing in length in a length direction, the connecting portion connecting the plurality of tape portions to each other at end portions in a length direction of the plurality of tape portions, and the connecting portion folding the plurality of tape portions in a folded state,
 wherein the plurality of tape portions each comprise openings near both ends in the length direction of each of the plurality of tape portions, the openings being configured to allow the tape body to be attached to the rotary connector, and
 wherein the plurality of tape portions each comprise a fixing portion to fix the plurality of tape portions together.

2. The tape assembly according to claim 1, wherein:
 the connecting portion is disposed connecting the end portions in the length direction of the plurality of tape portions to each other at center portions in a width direction of the end portions; and
 the connecting portion is formed having a width that is less than a width of each of the length direction folding back portions of the plurality of tape portions.

3. The tape assembly according to claim 1, wherein:
 a pair of the connecting portions are disposed connecting the end portions in the length direction of the plurality of tape portions to each other at both end portions in a width direction of the end portions, and
 the pair of connecting portions are each formed having a width that is less than ½ of a width of each of the length direction folding back end portions of the plurality of tape portions.

4. The tape assembly according to claim 2, wherein the connecting portion is formed having a width that is less than a width obtained by subtracting a width of each of the openings from a width of each of the end portions of the plurality of tape portions where the connecting portion is connected.

5. The tape assembly according to claim 1, wherein the connecting portion is machined such that, when the connecting portion having a folded shape is in an open state that is indicative of a state prior to the folding at the connecting portion, a projection is formed projecting outwardly when the connecting portion is folded back, in a thickness direction of the plurality of tape portions.

6. The tape assembly according to claim 1, wherein, the connecting portion has a width at a folded location that is less than a width of the connecting portion at a location connected with the end portions in the length direction of the plurality of tape portions where the connecting portion is disposed.

7. The tape assembly according to claim 1, wherein the fixing portions are each disposed on a side opposite to the connecting portion sandwiching each of the openings.

8. A rotary connector comprising the tape assembly described in claim 1.

9. A method for manufacturing a tape assembly configured to be attached to a rotary connector, the method comprising the steps of:
 creating a tape body integrally comprising a plurality of tape portions differing in length in a length direction and a connecting portion connecting the plurality of tape portions to each other at end portions in the length direction of the plurality of tape portions, the plurality of tape portions each comprising openings near both ends of each of the plurality of tape portions, the openings being configured to allow the tape body to be attached to the rotary connector, and the plurality of tape portions each comprising a fixing portion to fix the plurality of tape portions together; and
 folding back the plurality of tape portions of the tape body at the connecting portion.

10. The tape assembly according to claim 1, wherein:
 a pair of the connecting portions are disposed connecting the end portions in the length direction of the plurality of tape portions to each other at both end portions in a width direction of the end portions, and
 a recessed portion having an arc shape is formed only on, among both end portions in the width direction of each of the connecting portions, an end portion near a center of one of the plurality of tape portions in the width direction.

* * * * *